United States Patent
Lainimo et al.

[11] Patent Number: 6,113,065
[45] Date of Patent: Sep. 5, 2000

[54] METHOD AND ARRANGEMENT FOR LOW-PRESSURE LOCKING OF A GAS-FILLED DEVICE

[75] Inventors: Risto Lainimo, Laihia; Hannu Olli; Nils Österholm, both of Vaasa, all of Finland

[73] Assignee: ABB Transmit Oy, Vaasa, Finland

[21] Appl. No.: 09/125,116

[22] PCT Filed: Feb. 25, 1997

[86] PCT No.: PCT/FI97/00123

§ 371 Date: Sep. 30, 1998

§ 102(e) Date: Sep. 30, 1998

[87] PCT Pub. No.: WO97/31414

PCT Pub. Date: Aug. 28, 1997

[30] Foreign Application Priority Data

Feb. 26, 1996 [FI] Finland ................................. 960890

[51] Int. Cl.[7] .................... H02B 13/025; H01H 33/56; F17C 13/12
[52] U.S. Cl. ............................... 251/94; 74/527
[58] Field of Search ................. 251/94; 137/1; 74/527, 529, 532, 533

[56] References Cited

U.S. PATENT DOCUMENTS

| | | | |
|---|---|---|---|
| 3,124,158 | 3/1964 | Penfold | 251/94 X |
| 3,605,708 | 9/1971 | Jordan | 251/94 X |

FOREIGN PATENT DOCUMENTS

| | | |
|---|---|---|
| 0188156 | 7/1986 | European Pat. Off. . |
| 0735558 | 10/1996 | European Pat. Off. . |
| 1364999 | 5/1964 | France . |
| 2443227 | 3/1976 | Germany . |
| 9117385 | 11/1961 | WIPO . |

OTHER PUBLICATIONS

Patent Abstracts of Japan, vol. 18, No. 414 (Aug. 3, 1994) entitled "Lock Device and Display in Decreased Gas Pressure in Gas Switch" to I. Hiromitsu.

Patent Abstracts of Japan, vol. 17, No. 535 (Sep. 27, 1993) entitled "Lock Mechanism for Gas–Blast Load–Break Switch" to I. Shuji.

WPI/Derwent Abstracts, No. 84–246529, week 8440 entitled "Handle Locker . . . Drop Detector Operates" to Yaskawa Electric Mfg. Co., Ltd.

Primary Examiner—Kevin Lee
Attorney, Agent, or Firm—Dykema Gossett PLLC

[57] ABSTRACT

A locking plate attached to a rotatable steering shaft used to change operational settings of a low-pressure locking device of a gas-filled device includes a peripheral locking nose and peripheral adjustment noses on either side thereof, slide surfaces extending between the adjustment noses and the locking nose, the noses and slide surfaces cooperating with the tip of a longitudinally movable locking device whose longitudinal positioning can be released by a blocking device of a pressure detector connected to the gas-filled device.

8 Claims, 2 Drawing Sheets

METHOD AND ARRANGEMENT FOR LOW-PRESSURE LOCKING OF A GAS-FILLED DEVICE

BACKGROUND OF THE INVENTION

1. Field of the Invention

The invention relates to a method for low-pressure locking of a gas-filled device, wherein a steering movement of a pressure detector in association with a gas tank in the device causes interruption in the connection between a blocking means connected thereto and a locking means in the low-pressure locking device, a shift being caused in the locking means leading it to the path of motion of a locking plate connected to a steering shaft in the device in order to limit the movements of the locking plate.

2. The Prior Art

Such low-pressure locking is used, e.g., in transmission of electricity in association with a gas-filled switch disconnector, wherein the low-pressure locking monitors and sees to it that the gas pressure in the shielding-gas-filled switch disconnector continuously remains on an operational level. A gas pressure drop in such a switch disconnector causes environmental risks when the disconnector is being used. When the gas protecting the operation of the switch disconnector disappears or the pressure drops unfavourably, the device may explode if attempts are made to use it for switching.

It is known to use low-pressure locking in such a device to prevent the use of a switch disconnector if the pressure of the gas protecting the operation drops below an allowed limit, so that the tripping of the low-pressure locking prevents the switching from being done.

If this kind of a low-pressure locking connected to a gas space is tripped, the gas pressure in the switch disconnector tank has to be checked and gas has to be added when required. Similarly, after each tripping of the low-pressure locking, the locking mechanism has to be charged.

A problem with the low-pressure locking of known devices is, however, that low-pressure locking can be tripped also because of other reasons than a pressure drop caused by gas leakage. Thus, the pressure in the gas space of such a device is dependent on the temperature variations on site, and the tripping pressure activating the low-pressure locking is again dependent on the external pressure on site.

In this case temperature variations on site affect gas pressure in the gas space of the device so that a temperature drop causes the gas in the gas tank to contract leading to a pressure drop therein. This pressure drop may cause "unnecessary" tripping of the low-pressure locking. These problems are encountered when a device is used in regions with significant temperature variations, e.g. deserts, or regions with extremely low seasonal temperatures, such as Nordic wilds.

Variations in the external pressure of the gas space affect in turn the tripping pressure so that when the device is used in high atmospheric pressure, the tripping pressure of the device approaches the pressure in the gas space causing unnecessary tripping of the low-pressure locking.

Tripping of a low-pressure locking causes severe problems to the user of a power supply network as it is extremely laborious to charge known solutions intended to handle the locking. Thus, to charge the low-pressure locking, the electric line in the vicinity of a switch disconnector has first to be de-energized, and then service personnel have to get to the device and, after partial disassembly of the device, manually charge the low-pressure locking so that it can be reused. As devices using low-pressure locking are often situated extremely inconveniently, and even mounted on power poles clearly above ground level, to access and service them is laborious and time-consuming.

It is an object of the present invention to eliminate the disadvantages of known solutions and provide a new kind of solution for allowing reparation of erroneous operation due to external pressure and temperature variations by using remote control. The present invention also ensures operation of low-pressure locking by eliminating oxidation of its switching surfaces and resulting breakdown.

SUMMARY OF THE INVENTION

This object is achieved by a low-pressure locking, wherein a steering movement of the locking plate is used to achieve a movement in the direction of the longitudinal axis of the locking means and away from the locking plate, the pressure in a gas tank steering the pressure detector being sufficient to connect the pressure detector with a movement delimiter arranged in the locking means of a blocking means to prevent the movement of the locking means past the blocking means and to the path of motion of the locking plate.

The invention is based on the idea that since the pressure in the gas space steering the low-pressure locking is often restored to normal or sufficiently high to allow steering, external conditions being normalized, it would be preferable to charge the low-pressure locking by using the remote control of the device without it needing any special servicing.

With a charging means driven from outside the device and arranged in connection with the low-pressure locking, the operation of low-pressure locking can be restored without disassembling the device, provided that pressure has returned to normal or gas has been added to the tank of the device. Such a charging means can preferably also be used to refresh mechanical components in the locking mechanism to prevent potential oxidation in the device.

A device conforming with the invention is mainly characterized in that the locking plate comprises at least one locking nose whose edge projects from the area of the edge on the side of the locking means, an adjustment nose projecting from the area of the edge on at least one side of the locking nose, and a slide surface combining the locking nose and an adjustment nose for steering the locking device.

The invention offers significant advantages. Thus the low-pressure locking of the invention significantly facilitates repairing device malfunction due to environmental variations and consequently reduces repair and service and decreases failure in power transmission and the costs involved. Charging a low-pressure locking by means of the arrangement of the invention is also significantly simpler than in known solutions.

The low-pressure locking arrangement of the invention provides a security mechanism that better guarantees device operation and its use in a significantly wider geographical area than known solutions.

In the following the invention will be described in greater detail with reference to the accompanying drawings.

DETAILED DESCRIPTION OF THE DRAWINGS

DETAILED DESCRIPTION OF THE PREFERRED EMBODIMENT

Figure 1:
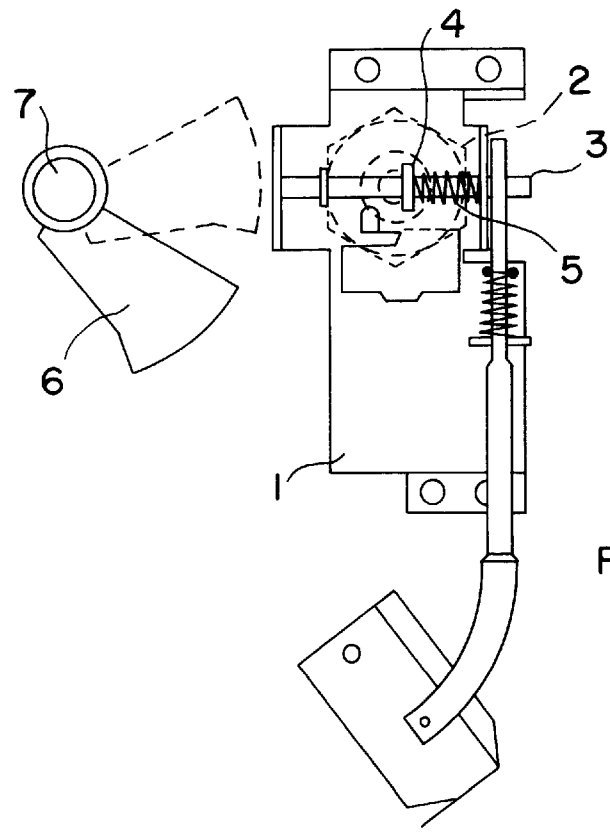
FIG. 1 shows a known charged low-pressure locking.
Figure 2:
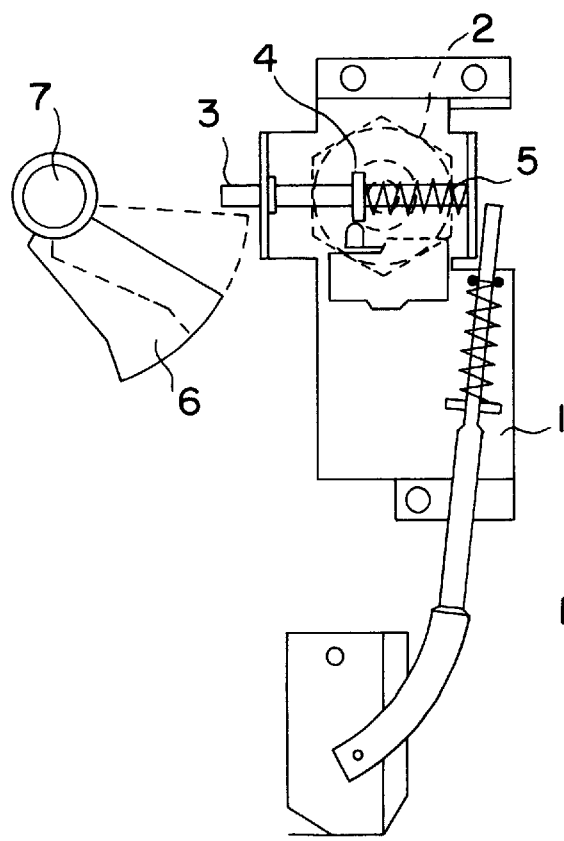
FIG. 2 shows a known tripped low-pressure locking.

The known embodiment of the structure of low-pressure locking shown in FIGS. 1 and 2 comprises a housing 1 with a mechanical pressure detector 2, such as a bellows, connected to it. A blocking means, associated with the pressure detector, prevents a locking means 3 from moving by blocking the path of a movement delimiter 4, such as a flange, in the locking means, when the pressure in a gas tank (not shown) of the gas-filled device is normal. When the pressure in the gas tank drops, the pressure detector 2 causes a movement in the blocking means, causing it to detach itself from the flange of the locking means. At this point, forced by a means 5, e.g., a spring, directing a transfer impulse, the locking means 3 moves a predetermined distance in the direction of its longitudinal axis. Pushed by the spring, the locking means moves to a state where it is arranged to prevent the circulation of a locking plate 6 in the locking device, simultaneously preventing modification in a switching state caused by a steering shaft 7 connected to the locking plate in a gas-filled device equipped with low-pressure locking.

Figure 3:
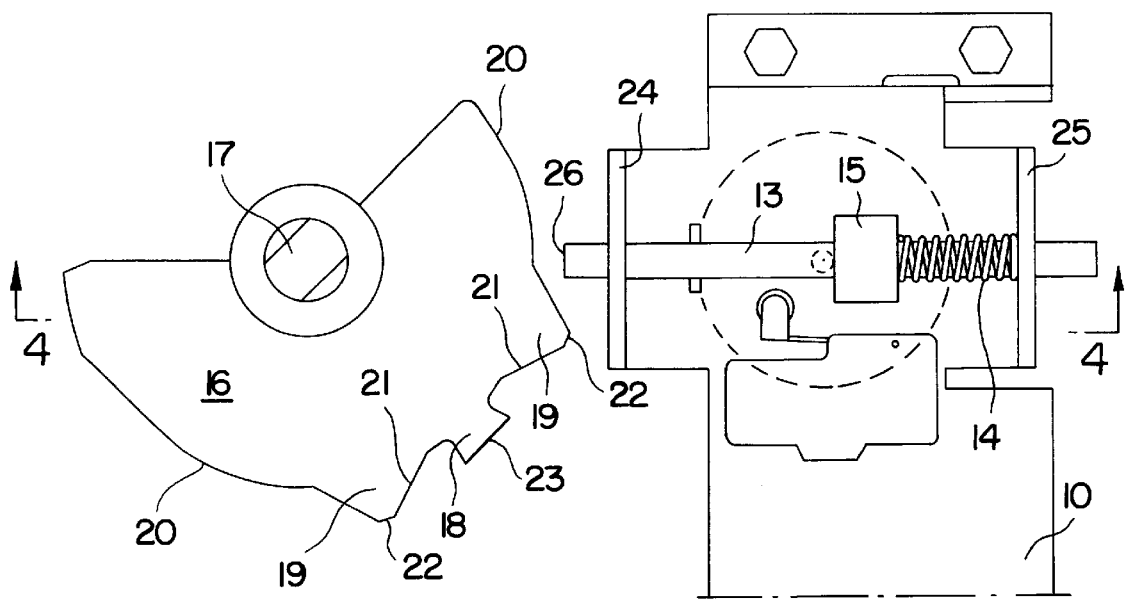
FIG. 3 is a top view of an embodiment of the low-pressure locking conforming with the invention.
Figure 4:
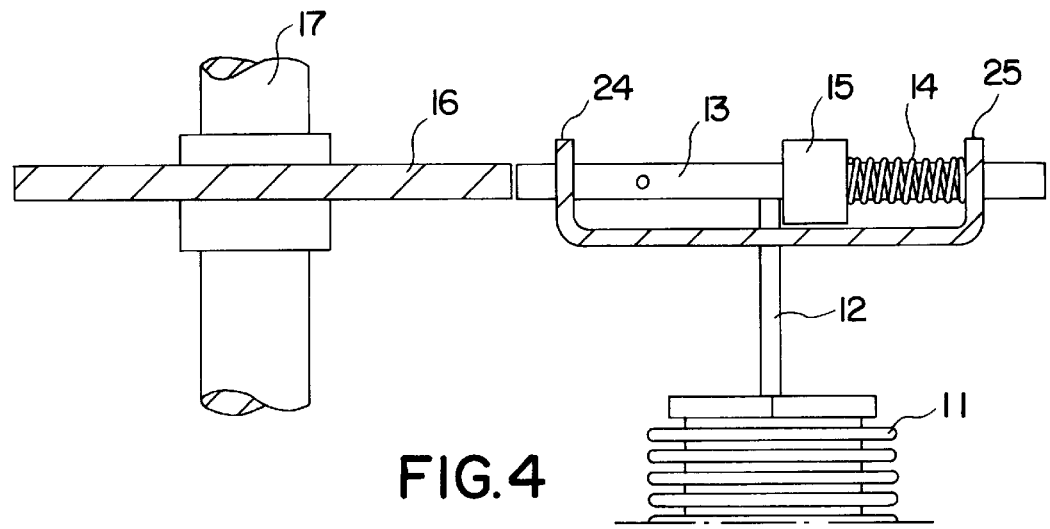
FIG. 4 shows the device of FIG. 3 as seen along line 4—4.

A preferred embodiment of low-pressure locking conforming with the invention and shown in FIGS. 3 and 4 comprises, e.g., a housing 10 in connection with a gas tank (not shown) of a switch disconnector, and a pressure detector 11 in connection thereto, preferably a mechanical detector, such as a bellows, and a blocking means 12 controlled by it. The blocking means is arranged in the immediate proximity of a locking means 13 in the locking device to prevent a transport means 14, such as a spring mechanism, from deflecting the locking means from its position of equilibrium. The limitation of the movement of this locking means has preferably been implemented as shown in FIGS. 3 and 4 by the blocking means 12, such as an elongated bolt, having moved in contact with a movement delimiter 15, such as a flange, the pressure in the gas tank of the gas-filled device being within predetermined limits. Thus the tip of the bolt projects past the outer edge of the flange towards the locking means forming a mechanical block which the flange in the locking means hits preventing movement of the locking means past the blocking means.

When pressure in the gas tank drops below the limit, the pressure detector 11 is arranged to react so that the blocking means 12 connected to it is steered away from the proximity of the locking means 13. This way the locking means, controlled by the transport means 14, is shoved in the direction of its longitudinal axis towards a locking plate 16 in the locking device and moves to its path of motion.

A locking plate 16 conforming with the invention comprises a locking nose 18 arranged essentially in the transverse direction of a steering shaft 17 in the locking device and projecting from the edge of the locking plate, and adjustment noses 19 preferably on both sides of the nose and projecting from the edge of the locking plate. A steering surface 20 is arranged on the side of the adjustment nose opposite to the locking nose, and a slide surface 21 is arranged between the adjustment nose and the locking nose.

The locking plate is essentially rigidly connected to the steering shaft steering the locking device.

When operational settings of the locking device are changed, the steering shaft 17 is turned, the movement causing a turning movement in the locking plate 16 connected to it. When the gas pressure in the gas tank of the gas-filled device is normal, and the low-pressure locking of the device is charged, the locking means 13 does not reach the elements on the locking plate, the locking plate freely turning steered by the steering shaft.

The adjustment nose 19 of the locking plate can, however, be designed so that the perpendicular distance between the tip 22 of the adjustment nose and the steering shaft is longer than the perpendicular distance between the tip 23 of the locking nose and the steering shaft. In this case, the adjustment nose hits the locking means when the steering shaft is turned, and consequently forces the locking means to retreat, causing to it, by each turning movement, a momentary small shift in relation to steering elements 24 and 25 in the housing and the blocking means 12. This small movement of the locking means ensures that unfavourable weather conditions do not cause harmful oxidation between the locking means and the surfaces steering it and prevent the movement of the locking means should the pressure drop in the gas tank of the gas-filled device.

With an unfavourable pressure drops in the gas tank, the pressure detector 11 causes release of the locking means 13 in the blocking means 12, the locking means moving, steered by the transport means 14, i.e. the spring, towards the locking plate 16. In this case, e.g. as shown in FIGS. 3 and 4, the elongated bolt moves, forced by the retracting bellows, away from the movement delimiter 15, such as a flange in the locking means. As the bolt no longer constitutes a mechanical block, which the flange in the locking means could hit, the spring in the locking means forces the locking means to pass the blocking means and to move to the path of motion of the locking plate.

This means that the locking means has moved to a state where its tip 26 is essentially on the path of the steering surface 20 of the locking plate. At the same time the movement delimiter 15 has preferably moved beside the blocking means so that it no longer stops the movement of the locking means.

When attempts are then made to carry out switching in the gas-filled device, a turning movement is caused to the steering shaft and the locking plate in it, the locking means moving along the steering surface of the locking plate to the adjustment nose 19. When the locking means reaches the adjustment nose, a movement directed back to its charging position is caused to the locking means. Being beside the tip 22 of the adjustment nose, the movement delimiter 15 in the locking means has passed the blocking means 12. If the pressure in the gas tank of the gas-filled device is again sufficiently high, the pressure detector has again steered the blocking means towards the locking means. In this case the retreat of the locking means back towards the locking plate is hindered, and the turning movement of the steering shaft can continue. In this way the low-pressure locking has been charged without any separate repair or service.

On the other hand, if the pressure in the gas tank of the gas-filled device continues to be unfavourably low, the locking means 13 moves to the slide surface 21 between the adjustment nose 19 and the locking nose 18 with the turning movement of the steering shaft continuing. In this case the steering movement, however, discontinues as the locking means hits the locking nose when proceeding on the slide surface.

In contrast to known devices, however, the arrangement for low-pressure locking of the invention allows attempts to steer immediately or in a while. In this case the locking plate is restored to its original position by an opposite turning movement of the steering shaft. When the locking plate is restored to its original position, the locking means moves back along the slide surface to the tip 22 of the adjustment nose, the movement delimiter in the locking means releasing the blocking means. If pressure has by now been restored in the gas tank, the blocking means is shoved, steered by the pressure detector, past the flange operating as the movement delimiter, towards the locking means, preventing the locking means from returning towards the locking plate. This means that the locking plate connected to the steering shaft is again free to turn, thus allowing a new switching movement in the gas-filled device.

It will be understood that the above description and the related drawings are only intended to illustrate the present invention. Consequently the invention is not restricted to the above description or the embodiment described in the claims, but it will be understood by those skilled in the art that various modifications and changes may be made without departing from the scope of the inventive idea.

What is claimed is:

1. A method for low-pressure locking of a gas-filled device with a low-pressure locking device, wherein a steering movement of a pressure detector in association with a gas tank in the gas-filled device causes interruption in the connection between a blocking means connected thereto and a locking means in the low-pressure locking device, a shift being caused in the locking means leading the locking means to the path of motion of a locking plate connected to a steering shaft in the device in order to limit the movements of the locking plate, wherein a steering movement of the locking plate is used to achieve a movement in the direction of the longitudinal axis of the locking means and away from the locking plate, the pressure in a gas tank steering the pressure detector being sufficient to connect the pressure detector with a movement delimiter arranged in the locking means of a blocking means to prevent the movement of the locking means past the blocking means and to the path of motion of the locking plate.

2. A method as claimed in claim 1, wherein the movement of the locking plate is limited by the locking means, the locking plate being steered back essentially to its original position in order to perform a new steering movement.

3. An arrangement for low-pressure locking of a gas-filled device, comprising a pressure detector with a blocking means arranged therein in association with a gas tank in the device, and a locking means with a movement delimiter for limiting the movements of a locking plate connected to a steering shaft in the device, wherein the locking plate comprises at least one locking nose whose edge projects from the area of the edge on the side of the locking means, an adjustment nose projecting from the area of the edge on at least one side of the locking nose, and a slide surface combining the locking nose and the adjustment nose for steering the locking means.

4. An arrangement as claimed in claim 3, wherein the perpendicular distance between a tip of the adjustment nose and the steering shaft is longer than the perpendicular distance between a tip of the locking nose and the steering shaft.

5. An arrangement as claimed in claim 3, wherein the locking plate comprises an adjustment nose projecting from the area of the edge on both sides of the locking nose.

6. An arrangement as claimed in claim 3, wherein the locking plate comprises a steering surface on the side of at least one adjustment nose opposite to the locking nose for steering the locking means past the adjustment nose.

7. An arrangement as claimed in claim 3, wherein the locking plate is an essentially planar element on the surface of a section of the locking means.

8. An arrangement as claimed in claim 3, wherein the locking plate is an element essentially in the form of a circular sector.

* * * * *